(12) United States Patent
Asakawa et al.

(10) Patent No.: US 10,324,335 B2
(45) Date of Patent: Jun. 18, 2019

(54) DISPLAY DEVICE

(71) Applicant: Japan Display Inc., Minato-ku (JP)

(72) Inventors: Youichi Asakawa, Tokyo (JP); Toshihiko Fukuma, Tokyo (JP); Ken Onoda, Tokyo (JP); Shinichi Komura, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/442,185

(22) Filed: Feb. 24, 2017

(65) Prior Publication Data

US 2017/0242302 A1 Aug. 24, 2017

(30) Foreign Application Priority Data

Feb. 24, 2016 (JP) .................................. 2016-032940

(51) Int. Cl.
*G02F 1/1335* (2006.01)
*G02F 1/13363* (2006.01)

(52) U.S. Cl.
CPC .... *G02F 1/133615* (2013.01); *G02F 1/13362* (2013.01); *G02F 1/13363* (2013.01); *G02F 1/133504* (2013.01); *G02F 1/133528* (2013.01); *G02F 1/133602* (2013.01); *G02F 1/133604* (2013.01); *G02F 1/133621* (2013.01); *G02F 2001/133614* (2013.01); *G02F 2001/133638* (2013.01); *G02F 2413/03* (2013.01); *G02F 2413/07* (2013.01)

(58) Field of Classification Search
CPC ......... G02F 1/133615; G02F 1/133504; G02F 1/133528; G02F 1/13362; G02F 1/133621; G02F 1/13363; G02F 2001/133614; G02F 2001/133638; G02F 2413/03; G02F 2413/07; G02F 1/133602; G02F 1/133604

See application file for complete search history.

(56) References Cited

U.S. PATENT DOCUMENTS

| | | | | |
|---|---|---|---|---|
| 7,750,984 B2* | 7/2010 | Ha | ....................... | G02B 6/0056 349/25 |
| 8,206,020 B2* | 6/2012 | Nagata | ................. | G02B 6/0028 362/259 |
| 8,979,344 B2* | 3/2015 | Chen | .................... | G02B 6/0035 362/609 |

(Continued)

FOREIGN PATENT DOCUMENTS

| | | |
|---|---|---|
| JP | 2004-246100 | 9/2004 |
| JP | 2004246100 A * | 9/2004 |

*Primary Examiner* — Nathanael R Briggs
(74) *Attorney, Agent, or Firm* — Oblon, McClelland, Maier & Neustadt, L.L.P.

(57) ABSTRACT

According to one embodiment, a display device includes a display panel including a first substrate, a second substrate, and an optical element layer provided between the substrates, a light directing unit facing the first substrate of the display panel, and including a first main surface disposed on a side facing the first substrate, and a second main surface disposed on a side reverse to the first main surface, and a light source unit disposed on the first substrate side with respect to the display panel, and emitting polarized light toward the first or second main surface. The polarized light is made incident on the first or second main surface, and directed perpendicularly to the optical element layer.

11 Claims, 14 Drawing Sheets

(56) References Cited

U.S. PATENT DOCUMENTS

| | | | | |
|---|---|---|---|---|
| 2007/0076149 A1* | 4/2007 | Daiku | ............ | G02B 6/0023 |
| | | | | 349/116 |
| 2012/0002137 A1* | 1/2012 | Saito | ............ | G02F 1/133615 |
| | | | | 349/64 |
| 2016/0037147 A1* | 2/2016 | Kempf | ............ | H04N 9/3188 |
| | | | | 348/744 |

* cited by examiner

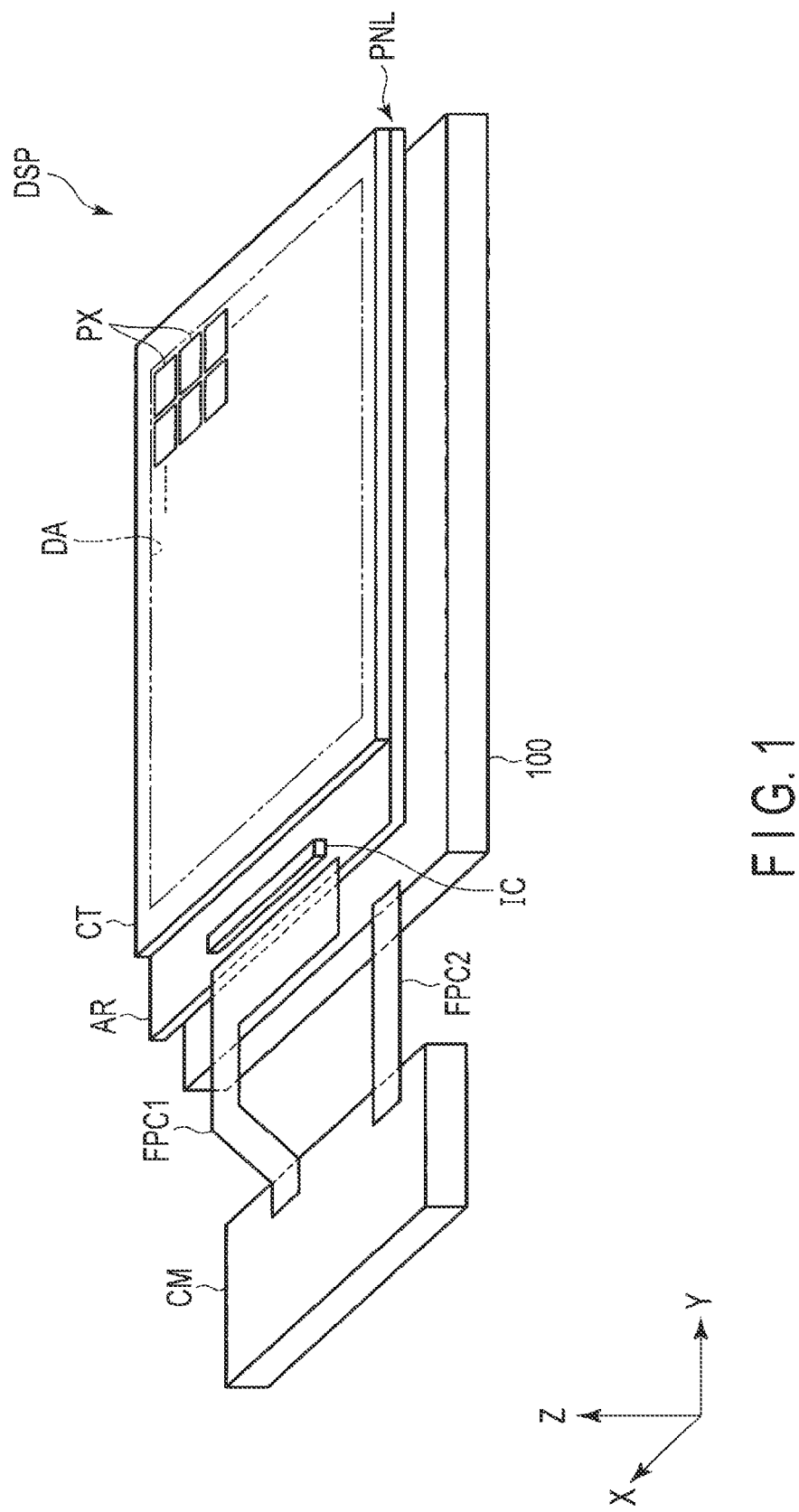
F I G. 1

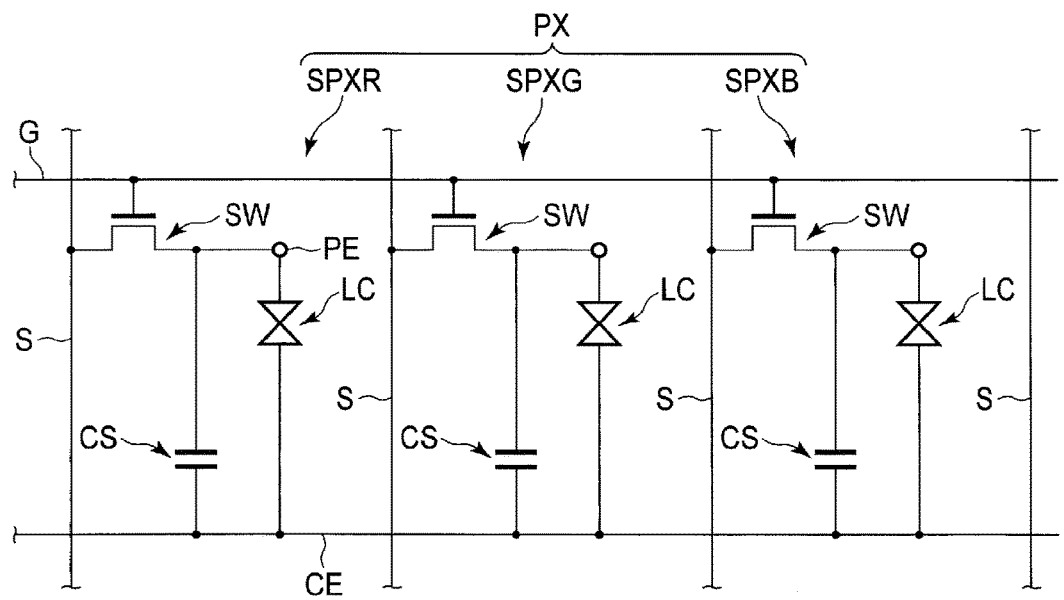
F I G. 2
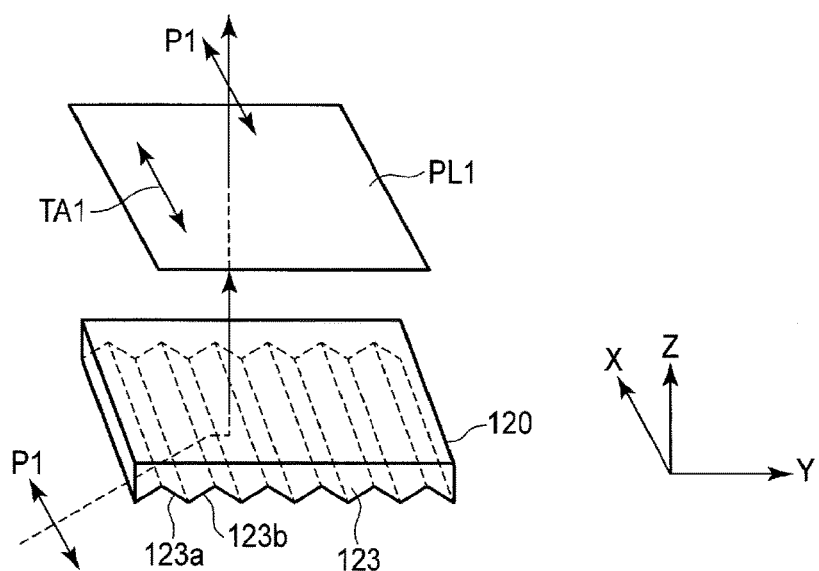
F I G. 6

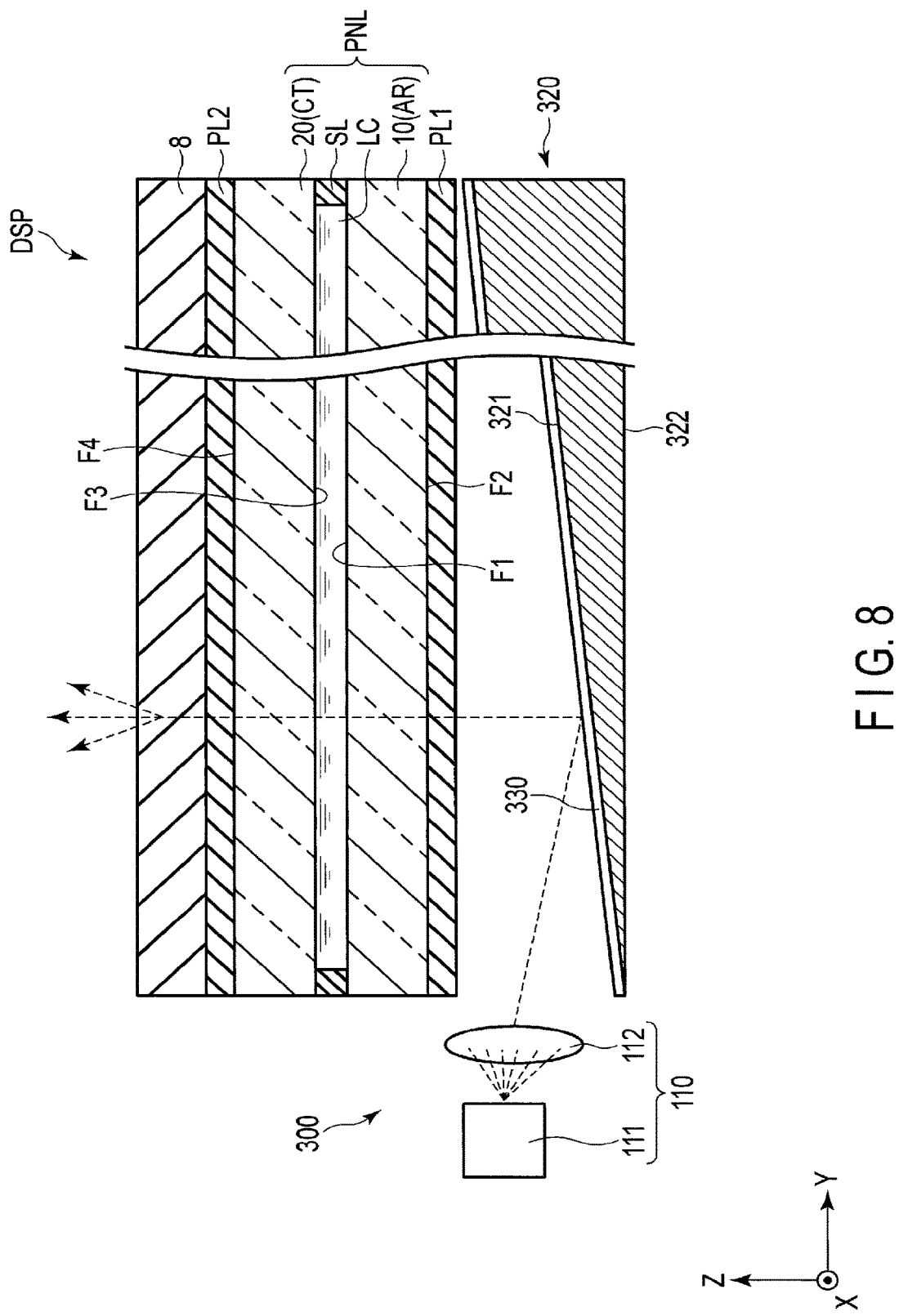
F I G. 8

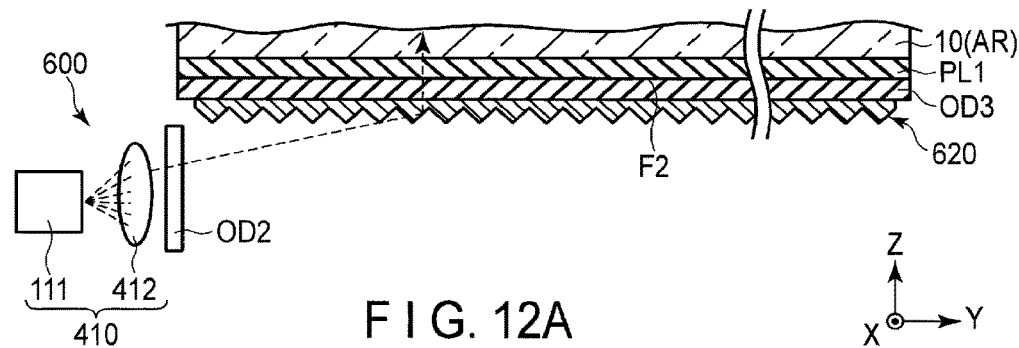
F I G. 12A
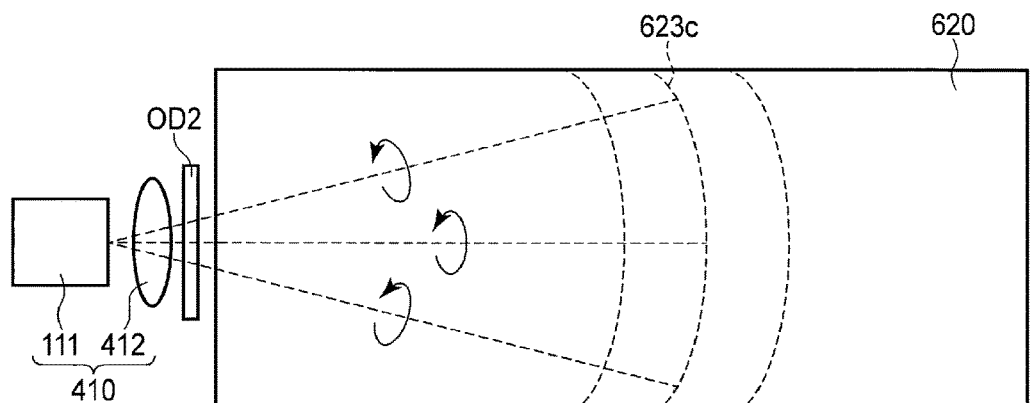
F I G. 12B
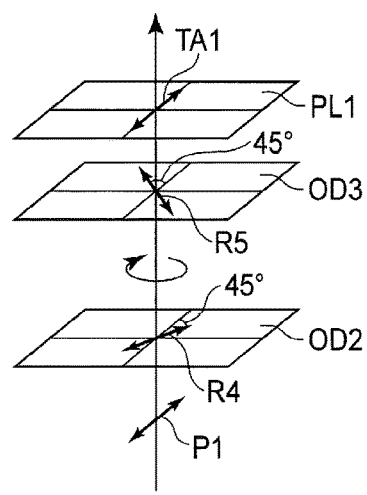
F I G. 12C

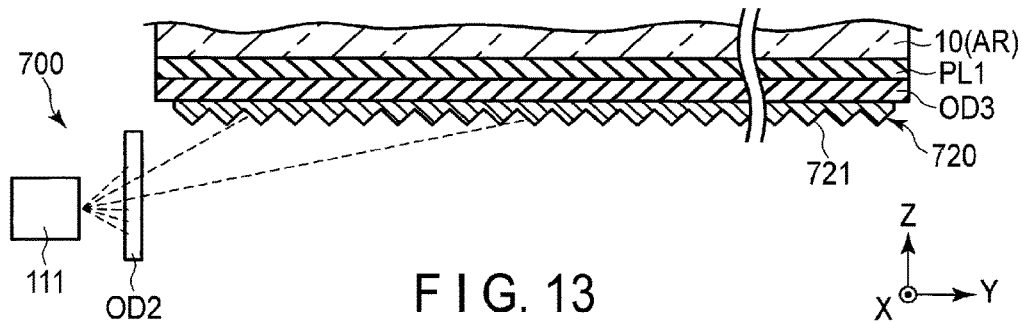
F I G. 13
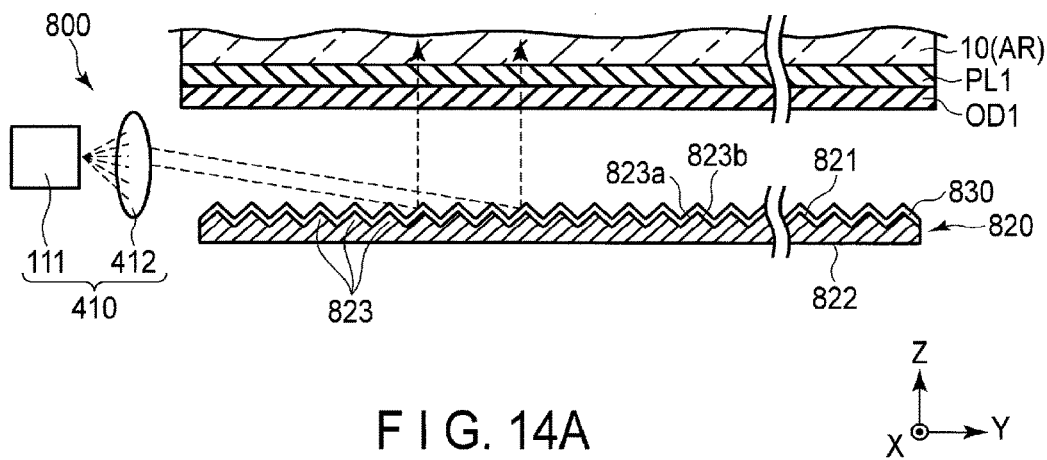
F I G. 14A
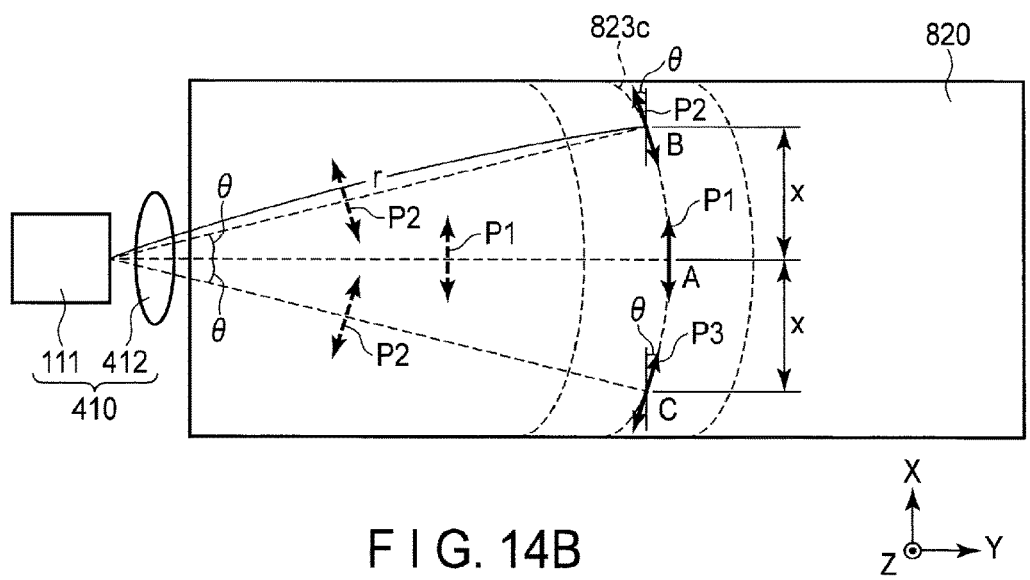
F I G. 14B

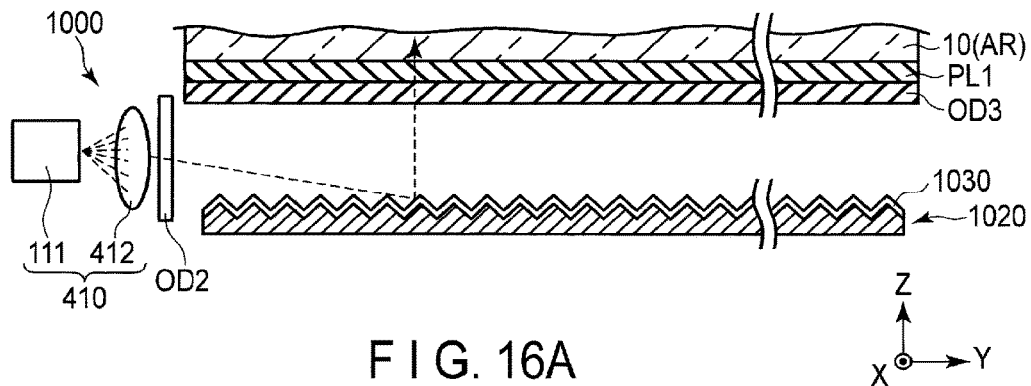
F I G. 16A
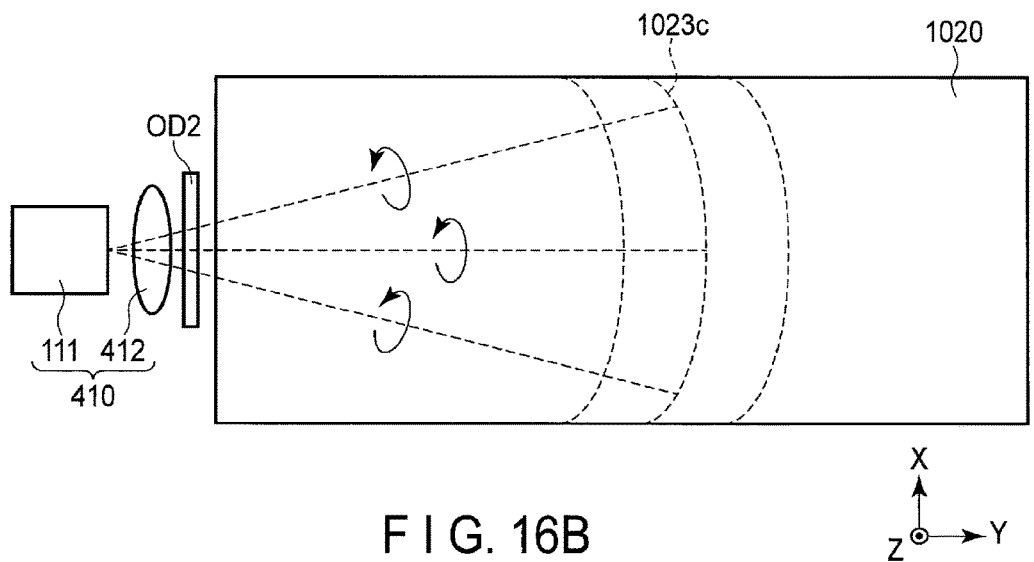
F I G. 16B
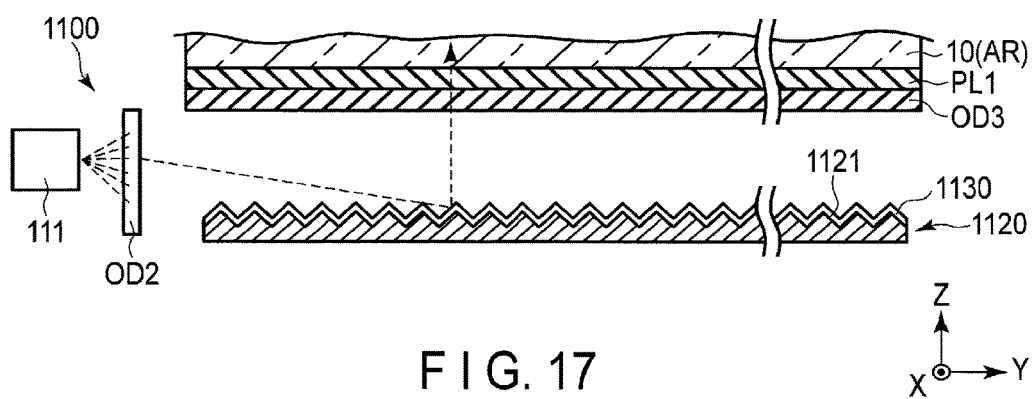
F I G. 17

DISPLAY DEVICE

CROSS-REFERENCE TO RELATED APPLICATIONS

This application is based upon and claims the benefit of priority from Japanese Patent Application No. 2016-032940, filed Feb. 24, 2016, the entire contents of which are incorporated herein by reference.

FIELD

Embodiments described herein relate generally to a display device.

BACKGROUND

Display devices are used for various apparatuses, such as smartphones, tablet terminals, mobile phone terminals, personal computers, television receivers, in-vehicle devices, game consoles, and wearable terminals.

Generally, transmission-type display devices, such as liquid crystal display devices, include a backlight including a light source unit and a light guide plate, a display panel, and polarizers arranged on both sides of the display panel. In the backlight, light from the light source is made incident on the light guide plate, and applied to the display panel from an emitting surface of the light guide plate.

The light guide plate is formed of a resin material. The light guide plate formed of such a material absorbs part of light from the light source, and may cause reduction in luminance of the emitting surface and non-uniformity in luminance in the emitting surface. In addition, the material of the light guide plate may be deformed due to heat, load, and moisture, and non-uniformity in luminance may occur also in this case. Besides, absorption of light in the light guide plate has wavelength dependence, and the wavelength dependence may cause color shift in which the light emitted from the emitting surface is shifted from the originally intended color, and color non-uniformity in the emitting surface.

BRIEF DESCRIPTION OF THE DRAWINGS

FIG. 1 is a perspective view illustrating a schematic structure of a display device according to a first embodiment;

FIG. 2 is a diagram illustrating a configuration example of a pixel included in the display device illustrated in FIG. 1;

FIG. 6 is a diagram illustrating a polarization direction of polarized light with respect to prism portions of the light directing unit;

FIG. 8 is a schematic cross-sectional view illustrating a display device according to a third embodiment;

FIG. 12A is a schematic cross-sectional view illustrating a display device according to a seventh embodiment;

FIG. 12B is a plan view illustrating a light source unit and a light directing unit illustrated in FIG. 12A;

FIG. 12C is a diagram illustrating a polarization direction of light, optical axis directions of a second retardation plate and a third retardation plate, and a transmission axis direction of a first polarizer;

FIG. 13 is a schematic cross-sectional view illustrating a display device according to an eighth embodiment;

FIG. 14A is a schematic cross-sectional view illustrating a display device according to a ninth embodiment;

FIG. 14B is a plan view illustrating a light source unit and a light directing unit illustrated in FIG. 14A;

FIG. 16A is a schematic cross-sectional view illustrating a display device according to an eleventh embodiment;

FIG. 16B is a plan view illustrating a light source unit and a light directing unit illustrated in FIG. 16A; and FIG. 17 is a schematic cross-sectional view illustrating a display device according to a twelfth embodiment.

DETAILED DESCRIPTION

Figure 3:
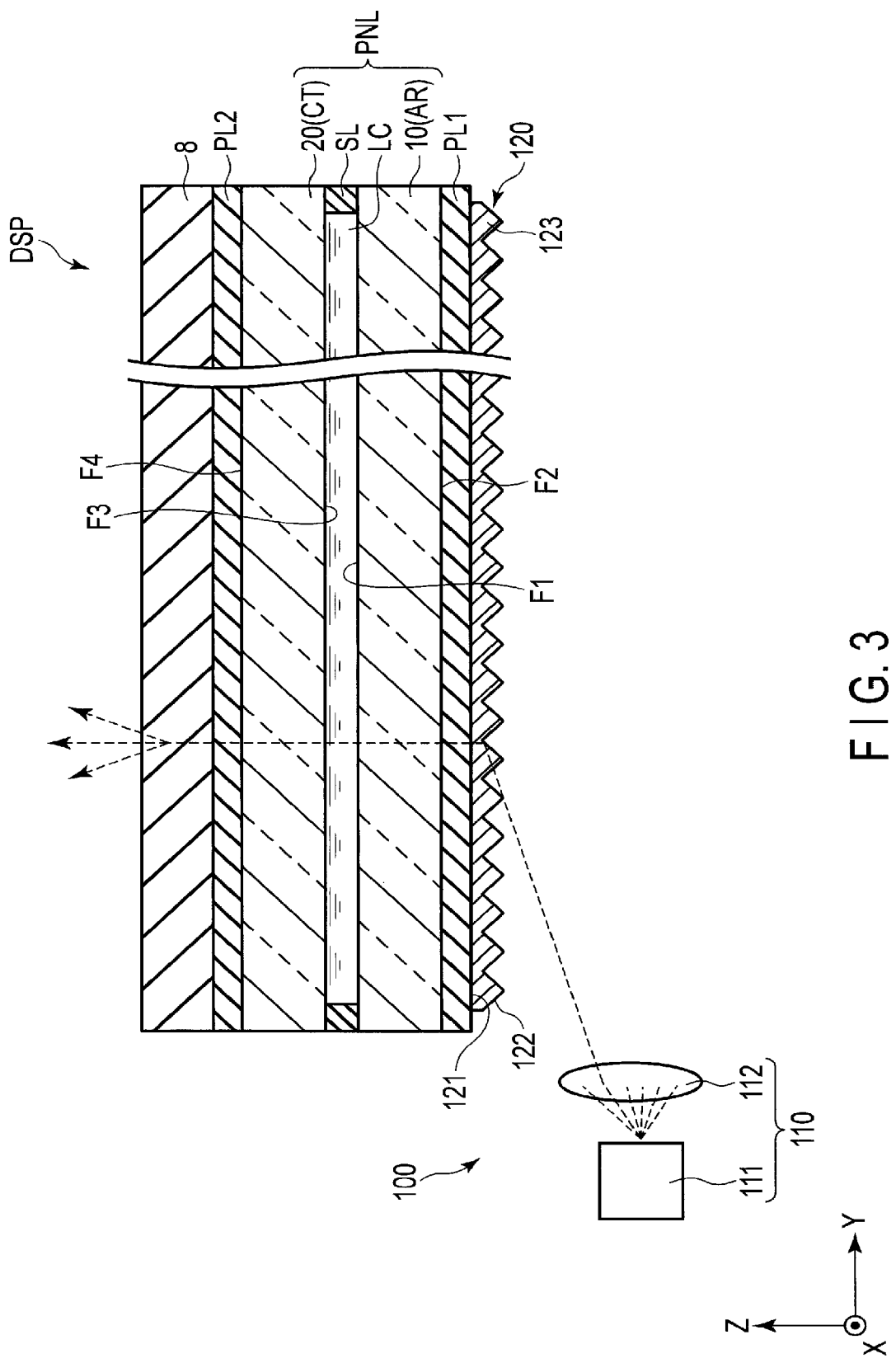
FIG. 3 is a schematic cross-sectional view of the display device illustrated in FIG. 1.

In general, according to one embodiment, a display device comprising: a display panel including a first substrate, a second substrate facing the first substrate, and an optical element layer provided between the first substrate and the second substrate; a light directing unit facing substantially the whole surface of the first substrate of the display panel, and including a first main surface disposed on a side facing the first substrate, and a second main surface disposed on a side reverse to the first main surface; and a light source unit disposed on the first substrate side with respect to the display panel, and emitting polarized light toward the first main surface or the second main surface, wherein the polarized light is made incident on the first main surface or the second main surface of the light directing unit, and directed perpendicularly to the optical element layer.

Some embodiments will be described hereinafter with reference to drawings. In each of the drawings, constituent elements exhibiting functions equal to or similar to those explained in the antecedent drawing will be denoted by the same reference numerals, and overlapping explanations are properly omitted.

Each of the embodiments discloses a transmission-type liquid crystal display device in which liquid crystal molecules function as optical elements, as an example of the display device, but the display device is not limited thereto. Each of the embodiments does not prevent application of individual technical ideas disclosed in each of the embodiments to display devices of other types. Examples of the display devices of other types include a display device including a mechanical display panel in which micro electro mechanical system (MEMS) shutters function as optical elements, and a display device including an electronic paper type display panel including electrophoretic elements.

First Embodiment

First, a display device according to a first embodiment will be explained with reference to FIG. 1 to FIG. 6. FIG. 1 is a perspective view illustrating a schematic structure of a display device DSP according to the first embodiment.

The display panel DSP includes a display panel PNL, a driving IC chip IC driving the display panel PNL, a light irradiation unit 100 irradiating the display panel PNL with light, a control module CM controlling operations of the display panel PNL and the light irradiation unit 100, and flexible circuit boards FPC1 and FPC2 transmitting control signals to the display panel PNL and the light irradiation unit 100.

In the present embodiment, as illustrated in FIG. 1, a first direction X, a second direction Y, and a third direction Z are defined. The first direction X is, for example, a direction extending along a short side of the display panel PNL. The second direction Y is a direction crossing the first direction X, and extending along a long side of the display panel PNL. The third direction Z is a direction crossing the first direction X and the second direction Y. In the illustrated example, the directions X, Y, and Z mutually cross perpendicularly, but the directions X, Y, and Z may cross at other angles.

The display panel PNL includes an array substrate AR, a counter substrate CT disposed opposite to the array substrate AR, and a liquid crystal layer (liquid crystal layer LC described later) disposed between the array substrate AR and the counter substrate CT. The display panel PNL includes a display area DA displaying an image. The display panel PNL includes, for example, a plurality of pixels PX arranged in a matrix manner in the first direction X and the second direction Y in the display area DA.

The driving IC chip IC is mounted on, for example, the array substrate AR. However, the driving IC chip IC may be mounted on the control module CM or the like. The flexible circuit board FPC1 connects the array substrate AR with the control module CM. The flexible circuit board FPC2 connects the light irradiation unit 100 with the control module CM.

FIG. 2 is a diagram illustrating a configuration example of the pixel PX. In FIG. 2, each of the pixels PX includes three subpixels SPXR, SPXG, and SPXB corresponding to red (R), green (G), and blue (B), respectively. The configuration of the pixel PX is not limited thereto, but may further include a subpixel corresponding to white or the like, or include a plurality of red, green, or blue subpixels.

Each of the subpixels SPXR, SPXG, and SPXB includes a switching element SW being a thin film transistor (TFT), and a pixel electrode PE. The switching element SW is electrically connected with a scanning line G supplied with a scanning signal, a signal line S supplied with a video signal, and the pixel electrode PE. The pixel electrode PE forms a storage capacitor CS with a common electrode CE disposed to extend over the subpixels SPXR, SPXG, and SPXB. The pixel electrode PE and the common electrode CE are formed of a transparent conductive material such as indium tin oxide (ITO).

When a scanning signal is supplied to the scanning line G connected with the switching element SW and a video signal is supplied to the signal line S connected with the switching element SW, a voltage corresponding to the video signal is applied to the pixel electrode PE. An electric field generated between the pixel electrode PE and the common electrode CE in the voltage application changes alignment of the liquid crystal molecules of the liquid crystal layer LC from its initial alignment state in which no voltage is applied. As described above, by controlling the voltage to be applied to the pixel electrode PE of each of the subpixels SPXR, SPXG, and SPXB, a color image using the light from the light irradiation unit 100 is displayed on the display area DA.

FIG. 3 is a schematic cross-sectional view of the display device DSP according to the first embodiment.

The array substrate AR includes a first substrate 10 being a glass substrate with translucency. In the same manner, the counter substrate CT includes a second substrate 20 being a glass substrate with translucency. Although the array substrate AR and the counter substrate CT include elements (for example, elements illustrated in FIG. 5) other than the first substrate 10 and the second substrate 20, respectively, the elements are omitted in FIG. 3. In the present embodiment, each of the first substrate 10 and the second substrate 20 is a glass substrate, these substrates may be formed of a resin material such as acrylic resin with translucency.

The first substrate 10 includes a first surface F1, and a second surface F2 on a reverse side of the first surface F1. The second substrate 20 includes a third surface F3, and a fourth surface F4 on a reverse side of the third surface F3. Each of the surfaces F1 to F4 is a surface parallel with the first direction X and the second direction Y, for example. The array substrate AR and the counter substrate CT are bonded to each other with a sealing material SL, in a state in which the first surface F1 and the third surface F3 face each other. The sealing material SL is formed in a frame shape to surround the display area DA. The liquid crystal layer LC is filled into a space enclosed by the array substrate AR, the counter substrate CT, and the sealing material SL.

The display device DSP includes a first polarizer PL1, a second polarizer PL2, and an emitting layer 8, in addition to the display panel PNL and the light irradiation unit 100. The first polarizer PL1 is provided on the second surface F2 of the first substrate 10. The second polarizer PL2 is provided on the fourth surface F4 of the second substrate 20. The emitting layer 8 is provided on the second polarizer PL2.

The light irradiation unit 100 includes a light source unit 110 and a light directing unit 120. The light source unit 110 includes a light emitting element 111 emitting polarized light, and a lens 112. The light source unit 110 is disposed below the array substrate AR, to face a surface of the array substrate AR including an end surface including upper and lower two short sides.

In the present embodiment, the light emitting element 111 is a point light source emitting diverging ray expanding with the second direction Y serving as the center. For example, a laser element such as a semiconductor laser emitting polarized laser light can be used as the light emitting element 111. The lens 112 converts the light from the light emitting element 111 into parallel light, and applies the light to the light direction unit 120. For example, a Fresnel lens or a diffractive lens may be used as the lens 112 like this, but the type of the lens is not particularly limited. In addition, the light emitting element 111 is not limited to one emitting laser light described above, but may be, for example a light emitting diode emitting polarized light.

The parallel light is also referred to as collimated light as another name, which is light going substantially straight in the space, and has high directivity. In the present disclosure, parallel light is not limited to light in which light beams are strictly parallel, but includes light with slight spread.

The light directing unit 120 faces at least the whole display area DA of the display panel PNL, with the first polarizer PL1 interposed therebetween. The light directing unit 120 includes a first main surface 121 disposed on a side facing the first substrate 10, and a second main surface 122 disposed on a reverse side of the first main surface. The light directing unit 120 has, for example, a rectangular plate-like external shape, and the first main surface 121 contacts the lower surface of the first polarizer PL1. The light directing unit 120 includes, for example, an uneven shape in the second main surface 122, and, for example, includes a plurality of prism portions 123. The light directing unit 120 has optical transparency, and is formed of resin or the like. The light directing unit 120 of the present embodiment preferably has low birefringence, from the viewpoint of maintaining the polarization direction of light passing through the inside thereof.

Figure 4:
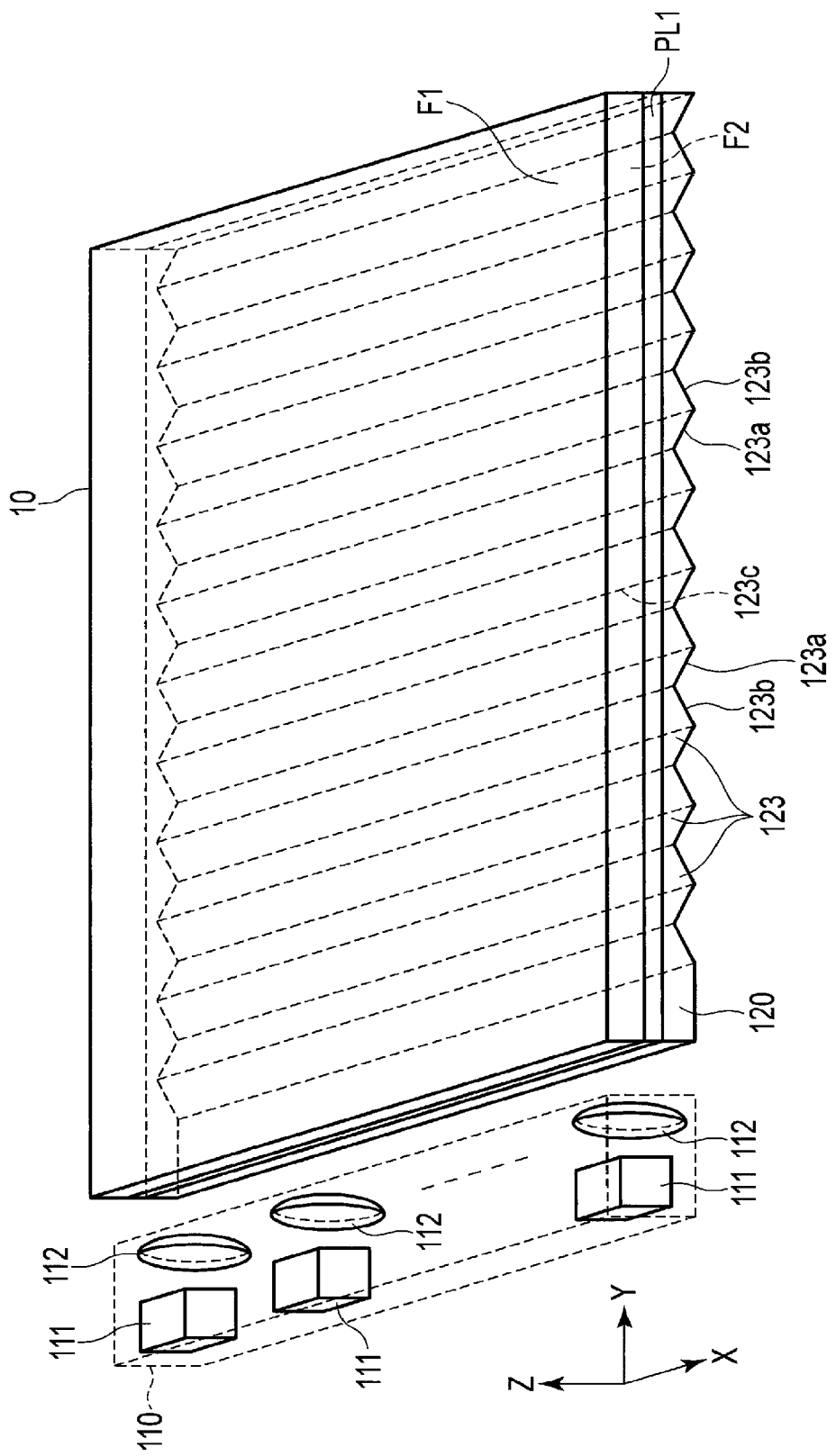
FIG. 4 is a schematic perspective view illustrating a light source unit, a first substrate, a first polarizer, and a light directing unit included in the display device illustrated in FIG. 1.

FIG. 4 is a perspective view schematically illustrating the structure of the light source unit 110, the first substrate 10, the first polarizer PL1, and the light directing unit 120. The light source unit 110 includes, for example, a plurality of pairs of light emitting elements 111 and lenses 112. The light emitting elements 111 and the lenses 112 of the respective pairs are arranged along the first direction X. Each of the light emitting elements 111 is mounted on, for example, the wiring board with which the flexible circuit board FPC2 (FIG. 1) is connected.

In FIG. 4, each of the prism portions 123 has a triangular cross section, and includes a first slope 123a facing the direction of the light source unit 110, and a second slope 123b facing a direction opposite to the light source unit 110. The slopes 123a and 123b are planes extending in parallel with the first direction X, and crossing the second direction Y and the third direction Z. Specifically, the slopes 123a and 123b are inclined with respect to the first surface F1 and the second surface F2 of the first substrate 10. The line in which the first slope 123a and the second slope 123b cross is a top line 123c of the prism portion 123. The top line 123c is orthogonal to a traveling direction of the light emitted from the light source unit 110 in plan view. Specifically, each of the top lines 123c of the prism portions are parallel with the first direction X. The term "parallel" is not strictly limited to relation in which two straight lines do not cross each other even if they are extended so far, but also includes substantial parallel relation in which one straight line is slightly inclined with respect to the other straight line.

In the present embodiment, the emitting layer 8 is provided instead of an ordinary color filter. The emitting layer 8 includes phosphor, and light emitted from the light emitting element is excitation light having a wavelength exciting the phosphor. In FIG. 3, a broken line with arrows at distal end indicates an example of optical path of the light emitted from the light emitting element 111 and emitted from the emitting layer 8. The light emitted from the light emitting element 111 is converted into parallel light by the lens 112, and applied to the prism portions 123 on the second main surface 122 of the light directing unit 120. The light applied to the prism portions 123 is made incident on the first slopes 123a of the prism portions 123 to be refracted, totally reflected in the second slopes 123b, and perpendicularly directed to the liquid crystal layer LC. The light directed by the light directing unit 120 passes through the first polarizer PL1, the array substrate AR, the liquid crystal layer LC, the counter substrate CT, and the second polarizer PL2, and reaches the emitting layer 8. As explained in detail hereinafter, the light made incident on the emitting layer 8 excites the phosphor, and non-directive peculiar light is emitted from the phosphor.

Figure 5:
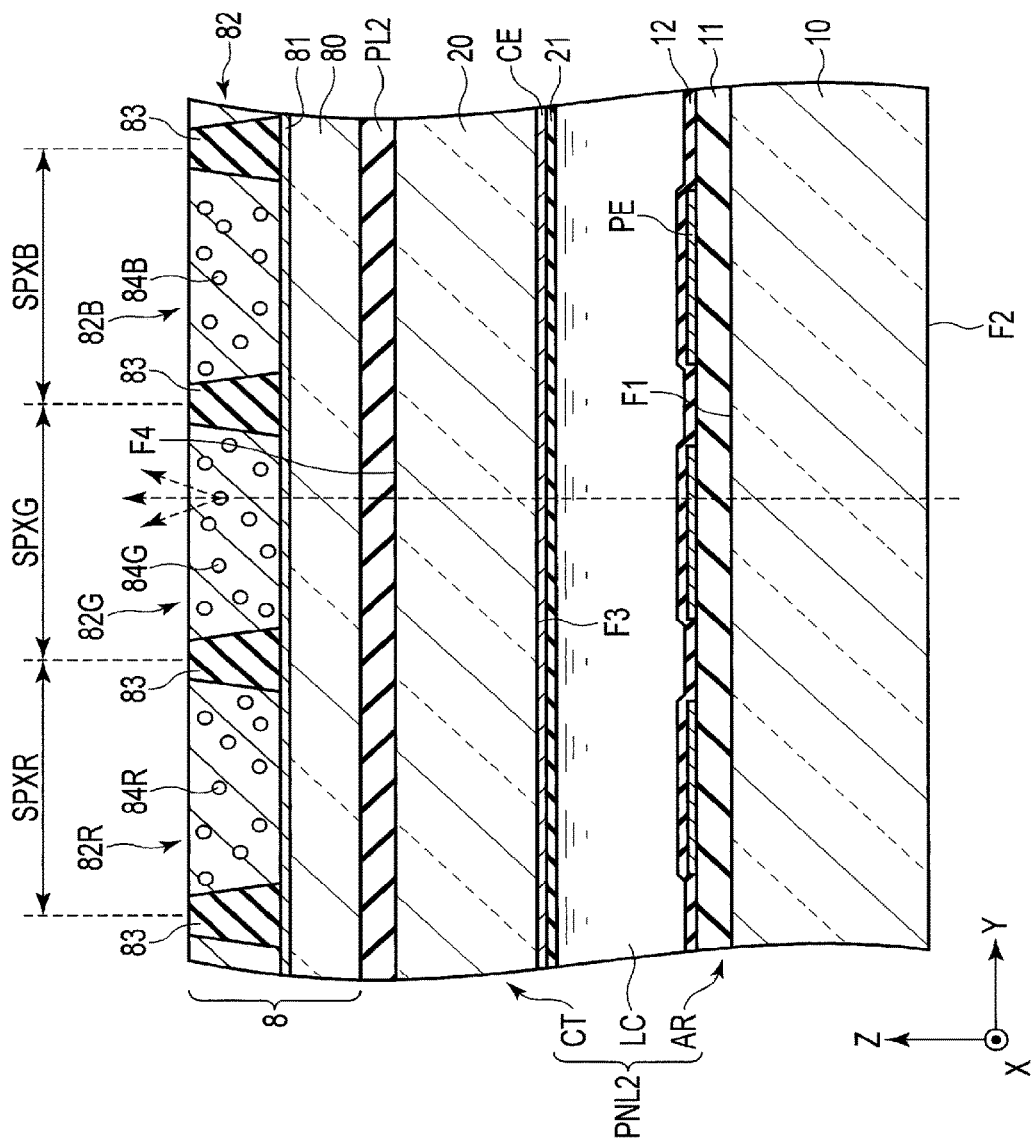
FIG. 5 is a cross-sectional view illustrating a structure of a display panel and an emitting layer included in the display device illustrated in FIG. 1.

FIG. 5 is a cross-sectional view illustrating the display panel PNL and the emitting layer 8. The example of the drawing illustrates a schematic structure corresponding to the subpixels SPXR, SPXG, and SPXB, and omits the scanning line G and the signal line S formed in the array substrate AR, the switching elements SW, various insulating films, the first polarizer PL1, and the light directing unit 120.

The array substrate AR includes an insulating layer 11, a first alignment film 12, and the pixel electrodes PE described above, in addition to the first substrate 10. The insulating layer 11 is formed on the first surface F1 of the first substrate 10. The pixel electrodes PE are formed in regions corresponding to the subpixels SPXR, SPXG, and SPXB, and on a surface of the insulating layer 11 on the counter substrate CT side. The pixel electrodes PE are formed of a transparent conductive material such as indium tin oxide (ITO) and indium zinc oxide (IZO). The first alignment film 12 covers the insulating layer 11 and the pixel electrodes PE.

The counter substrate CT includes a second alignment film 21 and the common electrode CE described above, in addition to the second substrate 20. The common electrode CE is formed on the third surface F3 of the second substrate 20. The second alignment film 21 covers the common electrode CE. The liquid crystal layer LC is filled into the space between the first alignment film 12 and the second alignment film 21.

The emitting layer 8 includes a transparent substrate 80 having translucency, a reflection layer 81 reflecting visible light, and a phosphor layer 82. The transparent substrate 80 is provided on the second polarizer PL2. The reflection layer 81 covers the whole surface of the transparent substrate 80, and the phosphor layer 82 is disposed thereon. Specifically, a red phosphor layer 82R that absorbs excitation light and emits red light is disposed in the subpixel SPXR, a green phosphor layer 82G that absorbs excitation light and emits green light is disposed in the subpixel SPXG, and a blue phosphor layer 82B that absorbs excitation light and emits blue light is disposed in the subpixel SPXB.

As illustrated in FIG. 5, banks 83 are disposed between boundaries between the subpixels SPXR, SPXG, and SPXB. The phosphor layers 82R, 82G, and 82B are disposed in respective regions partitioned by the banks 83. The banks 83 are formed of, for example, black resin with light shielding property. The emitting layer 8 may include no banks 83.

The phosphor layer 82 includes phosphor in the base material resin. Specifically, the phosphor layer 82R includes phosphor 84R, the phosphor layer 82G includes phosphor 84G, and the phosphor layer 82B includes phosphor 84B. For example, quantum dots that receive light from the light source unit 110 and emit red, green, and blue light, respectively, may be used as the phosphor 84R, 84G, and 84B. The quantum dots are, for example, semiconductor minute particles, and enabled to generate light of various wavelengths by adjusting the grain size. The phosphor 84R, 84G, and 84B may be quantum dots that emit light of the same color. In this case, the resins serving as the base materials of the phosphor layers 84R, 84G, and 84B are colored red, green, and blue, respectively, to obtain red, green, and blue visible light from the respective phosphor layers.

As illustrated with a broken line with arrows at distal end serving as an example, the light directed in the perpendicular direction with respect to the liquid crystal layer LC by the light directing unit 120 (FIG. 3 and FIG. 4) is made incident on each phosphor layer, through the first polarizer PL1 (FIG. 3 and FIG. 4), the display panel PNL, the second polarizer PL2, the transparent substrate 80, and the reflection layer 81. The light made incident on each phosphor layer excites the phosphor included in the phosphor layer, and emits light of the color peculiar to the phosphor. Because the light emitted from the phosphor has no directivity, the viewing angle for display significantly broadens in comparison with the case of using an ordinary color filter.

Using the phosphor layer 82 having the structure described above enables, for example, use of phosphor emitting light in response to reception of ultraviolet light, by setting the light emitted by the light emitting element 111 to ultraviolet light having a main wavelength of 420 nm or less. In this case, it is preferable to use a visible-light reflection film having low reflectance and low absorptivity for ultraviolet light, and high reflectance for visible light, as the reflection layer 81. Using such reflection layer 81 reduces loss of ultraviolet light going from the display panel PNL toward the phosphor layer 82, and enhances luminance of the displayed image, because the reflection layer 81 reflects visible light emitted from the phosphor layer 82 and going toward the display panel PNL.

The excitation light emitted from the light emitting element 111 may be visible light. For example, blue (with a wavelength higher than 420 nm and equal to and less than 480 nm) laser light can be used as the light emitted from the light emitting element 111. In this case, no phosphor layer 82B may be provided. As another example, a light diffusion layer scattering laser light may be formed, instead of the phosphor layer 82B. Specifically, the display device may use laser light having a wavelength of 480 nm or less as the light source, and the phosphor layer may include at least a red phosphor layer and a green phosphor layer. The wavelength of light emitted from the light emitting element 111 and the structure of the emitting layer 8 may be properly changed.

Figure 9:
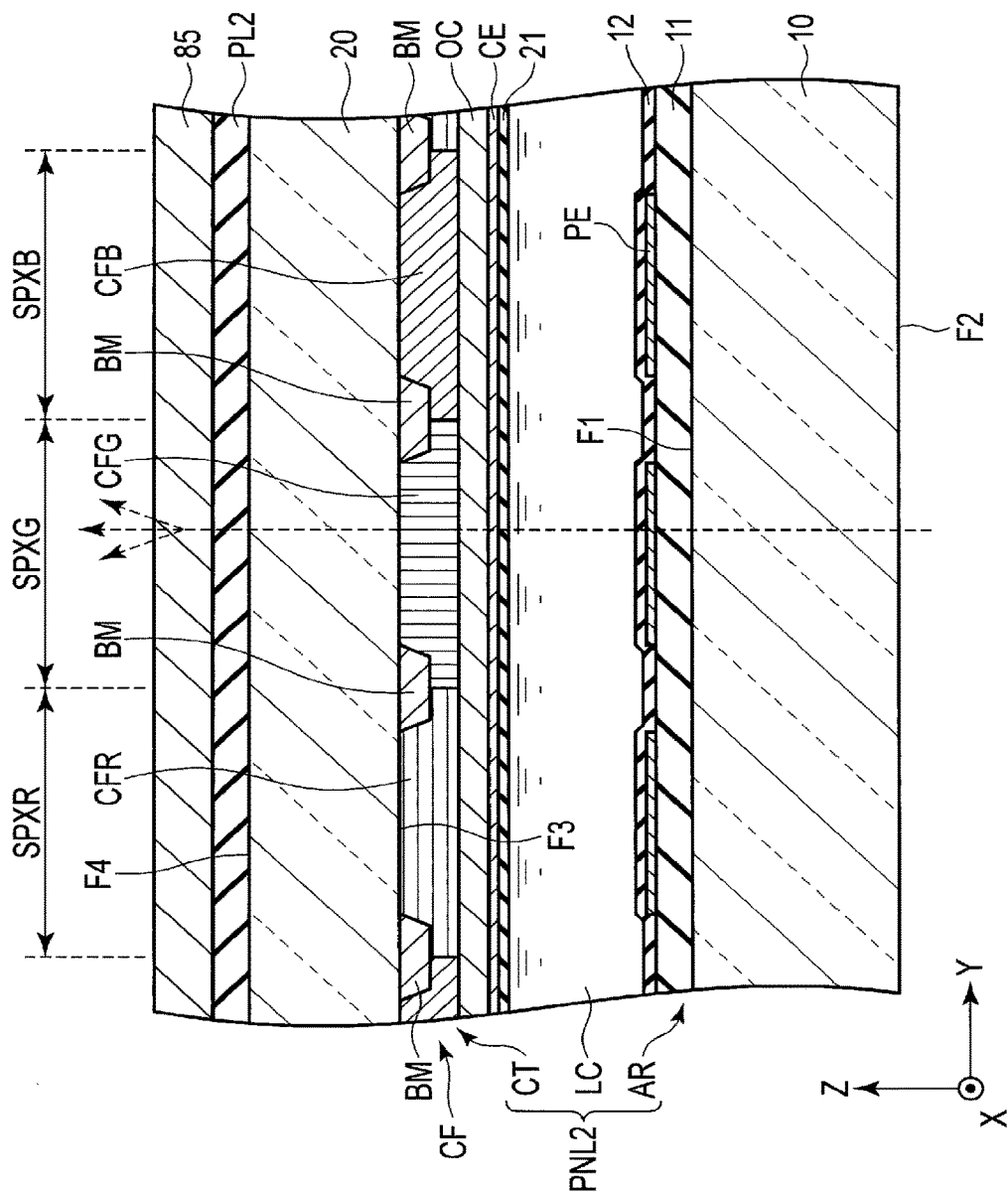
FIG. 9 is a diagram illustrating an example of a structure of a display panel and a light diffusion layer included in a display device according to a fourth embodiment.

In FIG. 5, laser light is diffused in the phosphor layer 82. The structure is not limited to this form, but a light diffusion layer 85 may be provided as illustrated in FIG. 9 described later, to diffuse light emitted from the phosphor layer 82.

FIG. 6 is a diagram illustrating a polarization direction of polarized light with respect to the uneven portion of the light directing unit.

Polarized light emitted from the light emitting element 111 (FIG. 3 and FIG. 4) is excitation light polarized in a direction parallel with, for example, a transmission axis of the first polarizer PL1, and orthogonal to the transmission axis of the second polarizer. The polarized light made incident on the prism portion 123 of the light directing unit 120 is linearly polarized light and polarized in a polarization direction P1. The polarization direction P1 is parallel with the first direction X. The first slope 123a and the second slope 123b of each of the prism portions of the second main surface extend in a direction parallel with the first direction X. Specifically, the polarization direction P1 of polarized light directed in the light directing unit 120 is parallel with the extending direction of the first slope 123a or the second slope 123b. The transmission axis direction TA1 of the first polarizer PL1 is parallel with the first direction X, that is, parallel with the polarizing direction P1. Accordingly, the polarization direction of polarized light transmitted through the first polarizer PL1 is parallel with the polarization direction P1.

In this case, light passing through a subpixel SPX in which no voltage is applied between the pixel electrode PE and the common electrode CE is transmitted through the first polarizer PL1, the polarized state of the light is not changed in the liquid crystal layer LC, and the light is absorbed by the second polarizer PL2. By contrast, when light passes through a subpixel SPX in which voltage is applied between the pixel electrode PE and the common electrode CE, the polarized state of the light is changed, and at least part of the light is transmitted through the second polarizer PL2. The light transmitted through the second polarizer PL2 excites the phosphor of the emitting layer 8, and diffused visible light of the color corresponding to the subpixel is emitted.

As described above, the display device according to the present embodiment includes no light guide plate formed of a resin material, and causes light from the light source unit to be directly made incident on the second main surface of the light directing unit. Using a light guide plate may cause reduction in luminance of light or non-uniformity in luminance, due to absorption of light in the light guide plate. In addition, the material of the light guide plate may be deformed due to heat, load, or moisture, and also may cause non-uniformity in luminance in the emitting surface. Besides, absorption of light in a light guide plate has wavelength dependence, and the wavelength dependence may cause color shift in which the light emitted from the emitting surface is shifted from the originally intended color, and color non-uniformity in the emitting surface. By contrast, the present embodiment has the structure in which light from the light source unit does not pass through a light guide plate. This structure suppresses such reduction in luminance, non-uniformity in luminance, color shift, and color non-uniformity, and enhances the display quality of the display device.

The following is explanation of display devices according to second to twelfth embodiments. These display devices are capable of obtaining the same effects as those of the display device according to the first embodiment.

Second Embodiment

Figure 7:
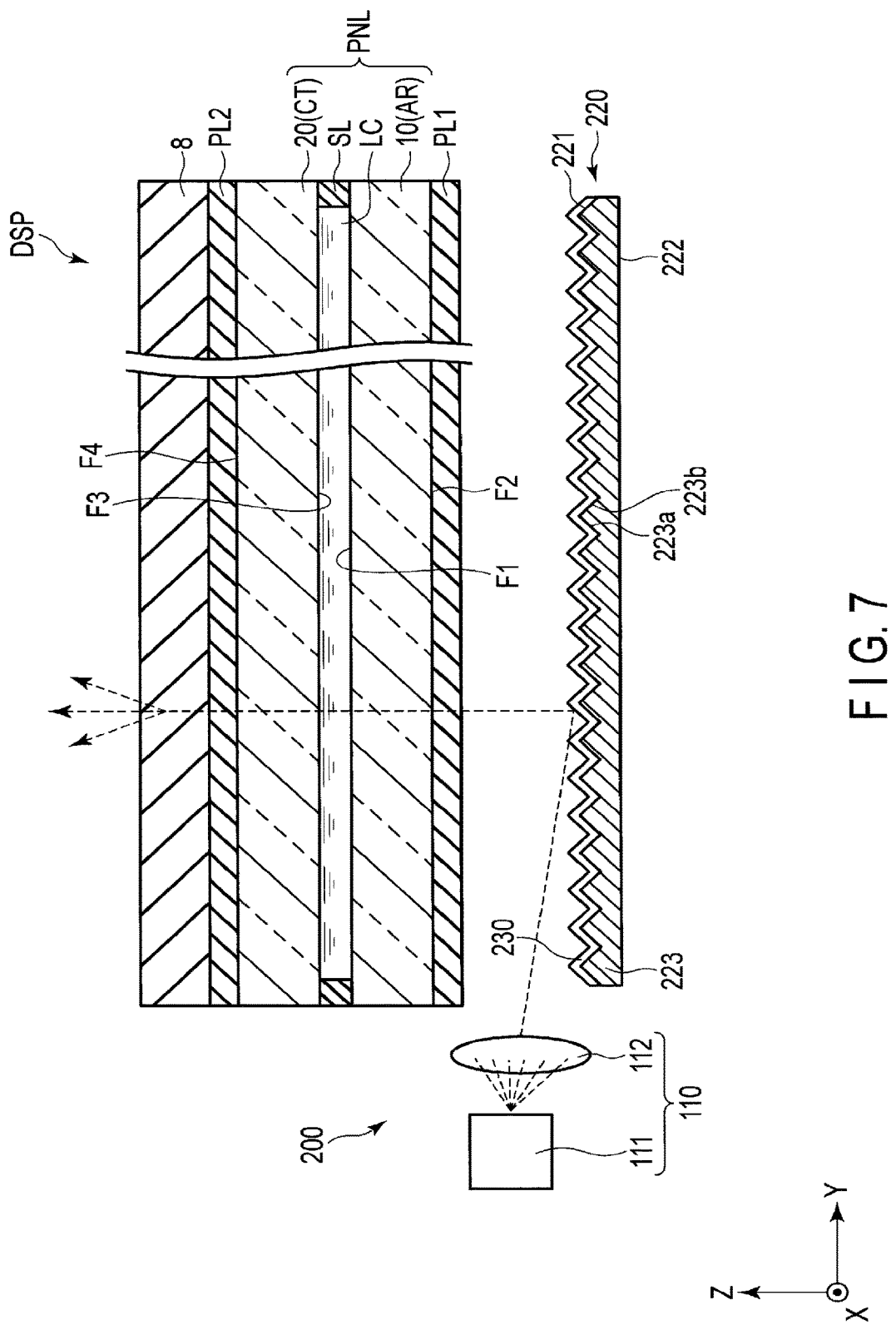
FIG. 7 is a schematic cross-sectional view illustrating a display device according to a second embodiment.

FIG. 7 is a schematic cross-sectional view illustrating a display device according to a second embodiment. The following embodiment produces the same effects as those of the display device described above. The second embodiment is different from the display device illustrated in FIG. 3, in particular, in that polarized light is made incident on a first main surface 221 of a light directing unit 220 facing the display panel.

The light directing unit 220 is distant from the display panel PNL beyond the light source unit 110, in the third direction Z. The light directing unit 220 has an uneven shape in the first main surface 221, and includes, for example, a plurality of prism portions 223 in the same manner as the first embodiment. Like the first embodiment, each of the prism portions 223 has a triangular cross section, and has a first slope 223a and a second slope 223b. A top line 223c of each prism portion extends in parallel with the first direction X, in the same manner as the first embodiment. The first main surface 221 is provided with a reflection layer 230 to cover the uneven shape. Polarized light made incident on the first main surface 221 is specularly reflected by the reflection layer 230 on the first slope 223a of the prism portion of the first main surface 221, and emitted in a direction perpendicular to the optical element layer formed of the liquid crystal layer LC. In this manner, the polarized light is directed to the optical element layer formed of the liquid crystal layer LC.

Third Embodiment

FIG. 8 is a schematic cross-sectional view illustrating a display device according to a third embodiment. The third embodiment is different from the configuration example illustrated in FIG. 3, in that a light directing unit 320 has a wedge shape, and polarized light is made incident on a first main surface 321 of the light directing unit facing the display panel.

The light directing unit 320 is distant from the display panel PNL beyond the light source unit 110, in the third direction Z, in the same manner as the light directing unit 220 of the display device according to the second embodiment. The first main surface of the light directing unit 320 is inclined with respect to an X-Y plane. The first main surface 321 is inclined toward a direction in which the light source unit 110 is disposed. The second main surface of the light directing unit 320 is a flat surface extending in a direction parallel with the X-Y plane. Polarized light made incident on the first main surface 321 is specularly reflected by a reflection paler 330 of the first main surface 321, and emitted in a direction perpendicular to the optical element layer formed of the liquid crystal layer LC. In this manner, the polarized light is directed to the optical element layer formed of the liquid crystal layer LC.

Fourth Embodiment

The first to the third embodiments disclose the structure in which the light emitted from the light source unit 110 is excitation light, and visible light is generated from the emitting layer 8 receiving the excitation light. By contrast, in the fourth embodiment, the light emitted from the light source unit is visible light. Constituent elements and effects that are not specifically referred to are the same as those in the first to the third embodiments.

FIG. 9 is a cross-sectional view illustrating an example of the structure of the display panel and a light diffusion layer included in a display device according to the fourth embodiment. The display panel PNL illustrated in FIG. 9 is different from that illustrated in FIG. 5, in the structure of the counter substrate CT. The counter substrate CT further includes a light shielding layer BM, a color filter CF, and an overcoat layer OC.

The light shielding layer BM is formed in the third surface F3 of the second substrate 20, to partition the subpixels SPXR, SPXG, and SPXB. The color filter CF covers the third surface F3 and the light shielding layer BM. The overcoat layer OC covers the color filter CF. The overcoat layer OC flattens unevenness caused by the light shielding layer BM and the color filter CF. The second alignment film 21 covers the overcoat layer OC.

As illustrated in FIG. 9, the pixel PX is formed of subpixels SPXR, SPXG, and SPXB corresponding to red, green, and blue, respectively, in the same manner as the example of FIG. 5. The color filter CF includes a color filter CFR corresponding to red, a color filter CFG corresponding to green, and a color filter CFB corresponding to blue. The color filter CFR is disposed in the subpixel SPXR, the color filter CFG is disposed in the subpixel SPXG, and the color filter CFB is disposed in the subpixel SPXB.

The pixel PX may further include a subpixel corresponding to white or the like, or include a plurality of subpixels corresponding to red, green, or blue. When the pixel PX includes a subpixel corresponding to white, the subpixel may include a color filter corresponding to white, or include no color filter. As described above in the first embodiment, the common electrode CE may be disposed in the same layer as, or a layer different from, the pixel electrode PE in the array substrate AR. The color filter CF may be provided in the array substrate AR.

As illustrated in FIG. 9, a light diffusion layer 85 is provided instead of the emitting layer 8 illustrated in FIG. 3. The light diffusion layer 85 may be, for example, a resin layer having a surface provided with a minute lens structure, or a resin layer including minute diffusion elements inside.

The light from the light source unit is, for example, white light. Such white light can be generated by preparing, for example, three light emitting elements emitting polarized laser light beams of red, green, and blue, respectively, and mixing the light beams emitted from the respective light emitting elements before the light beams are made incident on the light directing unit. As another example, light beams from the respective light emitting elements may be simultaneously applied to the prism portions, to cause the light reflected from the prism portions toward the liquid crystal layer LC to be white light.

The light emitted from the light source unit is refracted in the prism portions, and passes through the array substrate AR, the liquid crystal layer LC, and the counter substrate CT, in the same manner as the first to the third embodiments. The light changes to visible light of the color corresponding to the color filter CF, and reaches the second polarizer PL2. The light passing through the subpixel in which an electric field is formed between the pixel electrode PE and the common electrode CE passes through the second polarizer PL2 without being absorbed, and diffused by the light diffusion paler 85. Diffusing light like this enhances the viewing angle of the image displayed on the display area DA.

The structure of the present embodiment described above also suppresses reduction in luminance, non-uniformity in luminance, color shift, and color non-uniformity due to a light guide plate, like the first embodiment, and further reduces the thickness of the display device by virtue of reduction in the number of polarizers.

The present embodiment discloses the structure of using a color filter to enable color image display. However, the display device may be a display device DSP of a field sequential method, in which no color filter is used, but light emitting elements of red, green, and blue are turned on at high speed in a time-division manner, and images are switched at high speed in synchronization with it, to sequentially mix the images of the respective colors.

Fifth Embodiment

Figure 10A:
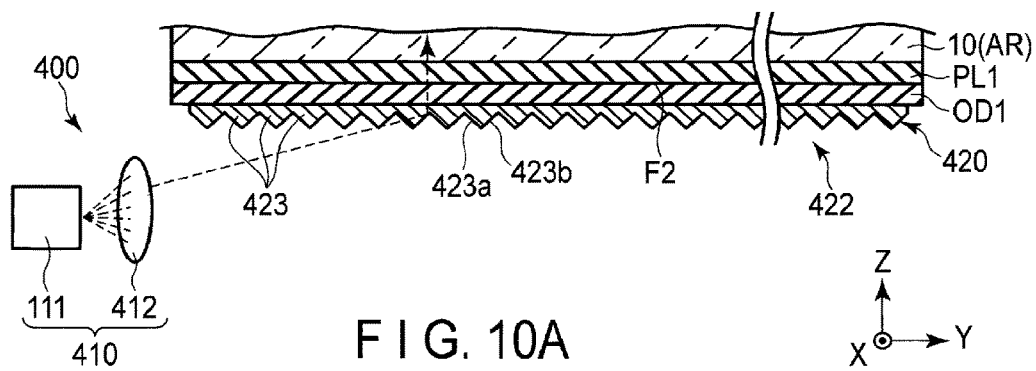
FIG. 10A is a schematic cross-sectional view illustrating a display device according to a fifth embodiment.
Figure 10B:
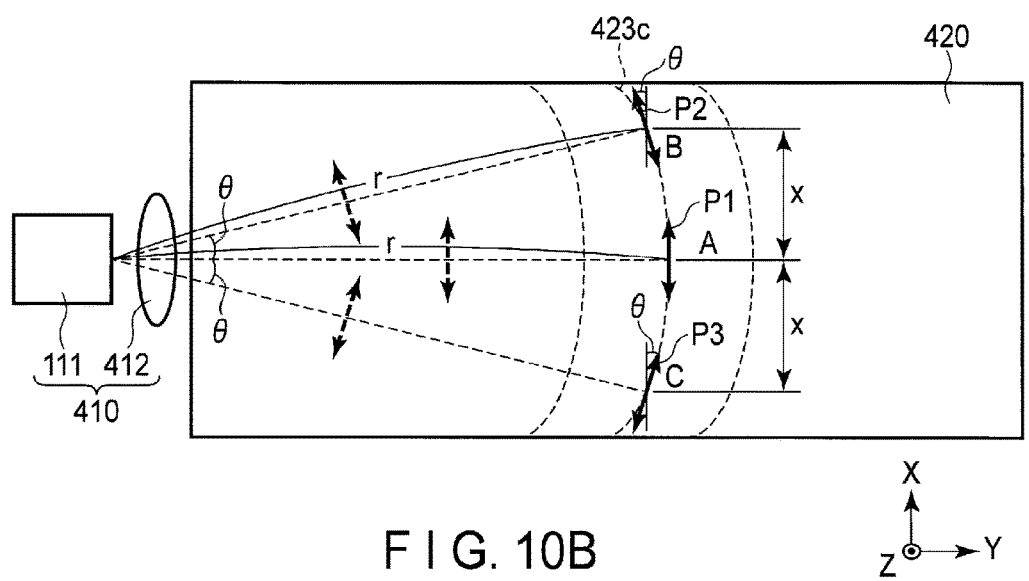
FIG. 10B is a plan view illustrating a light source unit and a light directing unit illustrated in FIG. 10A.

FIG. 10A is a schematic cross-sectional view of a display device according to a fifth embodiment, and FIG. 10B is a plan view illustrating a light source unit 410 and a light directing unit 420 illustrated in FIG. 10A. The first difference between the display device according to the fifth embodiment and the display device according to the first embodiment is that the display device according to the fifth embodiment includes a first retardation plate OD1. The first retardation plate OD1 is disposed, for example, between the first polarizer PL1 and the light directing unit 420.

The second difference between them is that the display device of the fifth embodiment includes a lens 412 and a light directing unit 420, instead of the lens 112 and the light directing unit 120. As illustrated in FIG. 10A, in a cross section parallel with the second direction Y and the third direction Z, the lens 412 converts light from the light emitting element 111 parallel. In addition, as illustrated in FIG. 10B, the lens 412 does not convert light from the light emitting element 111 parallel, in planes other than the cross section described above. The light that has passed through the lens 412 spreads in plan view, as illustrated in FIG. 10B. Specifically, the light source unit 410 is formed of the light emitting element 111 and the lens 412, and applies light toward the second main surface of the light directing unit.

The light directing unit 420 includes a plurality of prism portions 423, in the same manner as the light directing unit 120 illustrated in FIG. 3. Each of the prism portions has a triangular cross section, and includes a first slope 423a facing the light source unit 410, and a second slope 423b facing reverse to the light source unit 410. The prism portions 423 have a shape projecting reverse to a side on which the light source unit 410 is disposed. Each top line 423c extends in an arc shape as illustrated in FIG. 10B serving as a plan view. Each of the top lines 423c of the prism portions 423 extends in an arc shape, with the light emitting point of the light source unit 410 serving as the center. Specifically, the top lines of the first prism portions are orthogonal to the traveling direction of light from the light source unit, in plan view. For example, the slopes 423a and 423b are inclined curved surfaces extending along the respective top lines 423c. Points A, B, and C are points on the first slope 423a of the prism portion 423, and have an equal distance r from the light emitting point of the light source unit 410. The point A is a point located in the center of the prism portion 423. The point B is a point moved by x from the point A in the first direction X. The point C is a point moved by x from the point A in a direction opposite to the point B in the first direction X.

As illustrated in FIG. 10B, the polarized light emitted from the light source unit 410 is linearly polarized light, and polarized in the polarization direction P1. The polarization direction P1 is parallel with the first direction X. The light made incident on the point A is light going straight in the second direction Y from the emitting point of the light source unit 410, and polarized in the polarization direction P1. The light made incident on the point B is, for example, light going straight with a spread angle θ with respect to the second direction Y from the emitting point of the light source unit 410, and polarized in a polarization direction P2 rotated by θ from the first direction X. The light made incident on the point C is, for example, light going straight with a spread angle θ with respect to the second direction Y from the emitting point of the light source unit 410, and polarized in a polarization direction P3 rotated by θ in a direction opposite to P2 from the first direction X. The light made incident on the points A, B, and C are polarized in different polarization directions (P1, P2, and P3). The light made incident on the points A, B, and C of the first slope 423a are refracted by the first slope 423a, totally reflected by the second slope 423b, and directed in the third direction Z perpendicular to the optical element layer formed of the liquid crystal layer LC.

Figure 10C:
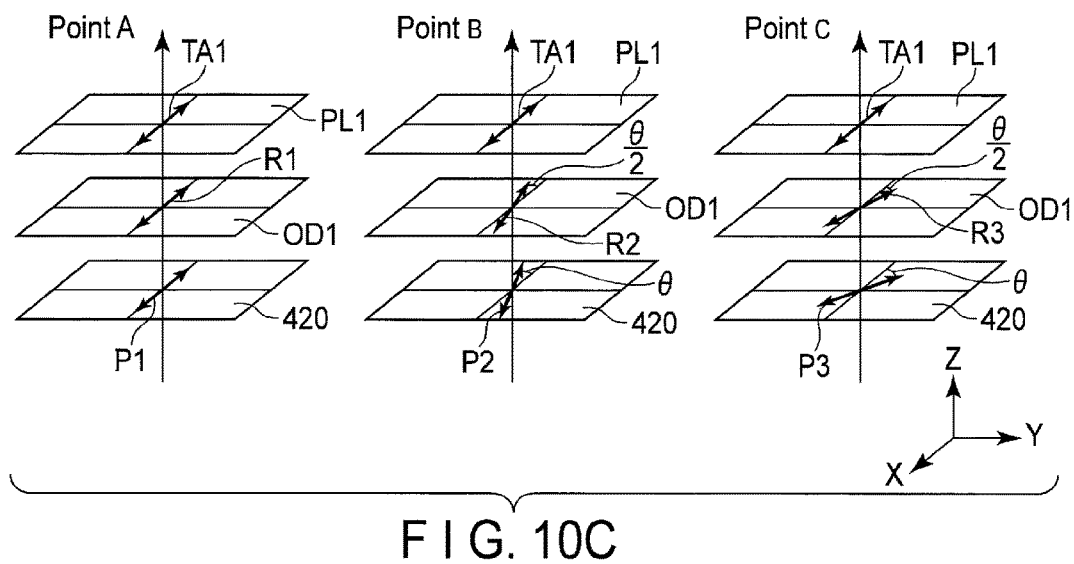
FIG. 10C is a diagram illustrating polarization directions of light, slow axis directions of a first phase difference plate, and a transmission axis direction of a first polarizer, in positions corresponding to points A, B, and C in FIG. 10B.

FIG. 10C is a diagram illustrating the polarization directions (P1 to P3) of light, slow axis directions (R1 to R3) of the first retardation plate OD1, and a transmission axis direction TA1 of the first polarizer PL1, in positions corresponding to the points A, B, and C.

The first retardation plate OD1 is a ½ wavelength plate having different slow axis directions according to the position. The first retardation plate OD1 enables rotation of the polarization direction of the passing light to be parallel with the transmission axis direction TA1 of the first polarizer PL1. For example, the first retardation plate OD1 has a slow axis direction R1 parallel with the first direction X, in the position corresponding to the point A. The first retardation plate OD1 has a slow axis direction R2 rotated by θ/2 from the first direction X, in the position corresponding to the point B. The first retardation plate OD1 has a slow axis direction R3 rotated by θ/2 in a direction opposite to R2 from the first direction X, in the position corresponding to the point C. The first retardation plate OD1 has slow-phase axes that are line-symmetrical with respect to the center line of the luminous flux of the polarized light in plan view, and different according to the position with respect to the center line. In the illustrated example, the slow-phase axes of the first retardation plate are line-symmetrical with respect to the center line of the first retardation plate OD1 running in the second direction Y. The transmission axis direction TA1 of the first polarizer PL1 is, for example, parallel with the first direction X.

In the position corresponding to the point A, the light polarization direction P1 is parallel with the slow axis R1 of the first retardation plate OD1 and the transmission axis TA1 of the first polarizer. In the position corresponding to the point A, the light polarization direction does not change even when the light is transmitted through the first retardation plate OD1, and the light is transmitted through the first polarizer PL1. In the positions corresponding to the points B and C, the light polarization directions P2 and P3 are rotated by θ/2 from the slow axis directions R1 and R2, respectively, of the first retardation plate OD1. For this reason, in the positions corresponding to the points B and C, the light transmitted through the first retardation plate OD1 is rotated by θ in directions opposite to the directions in which the light polarization directions P2 and P3 are rotated with respect to the slow axis directions R1 and R2, respectively. As a result, in the positions corresponding to the points B and C, the light polarization direction becomes parallel with the transmission axis direction TA1 of the first polarizer PL1, and is transmitted through the first polarizer PL1. As described above, the polarized light is directed by the light directing unit 420, thereafter passes through the first retardation plate OD1 and the first polarizer PL1 in this order, and is applied to the liquid crystal layer LC.

The display device according to the fifth embodiment has the same structure as that of the display device according to the first embodiment, except for the first and the second differences.

Sixth Embodiment

Figure 11A:
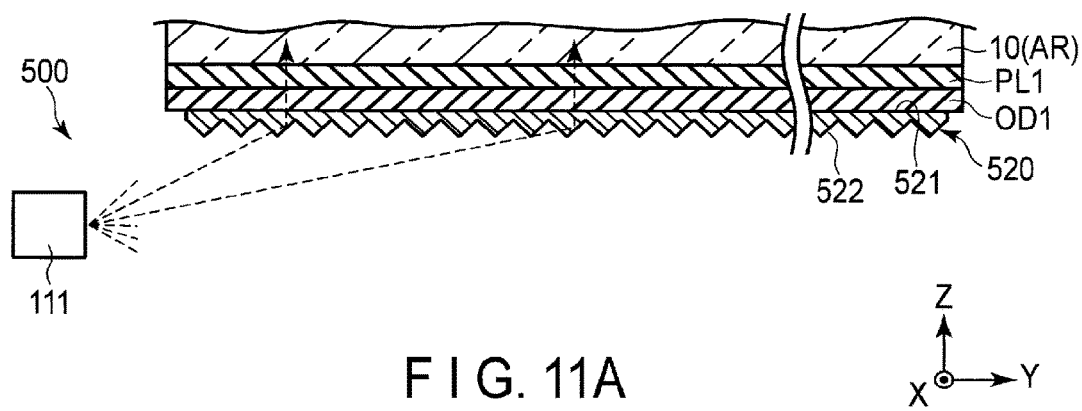
FIG. 11A is a schematic cross-sectional view illustrating a display device according to a sixth embodiment.
Figure 11B:
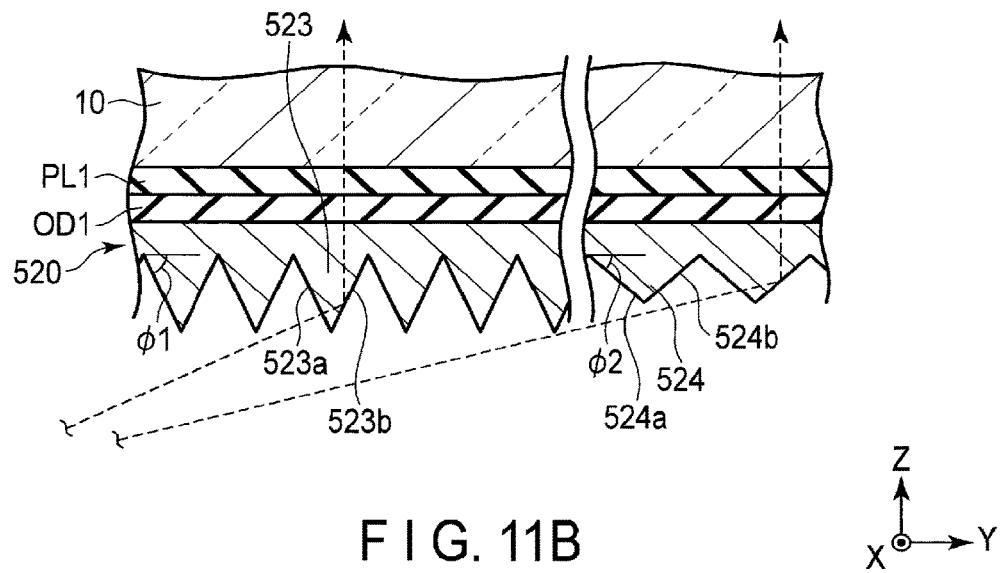
FIG. 11B is a schematic cross-sectional view illustrating a light directing unit included in the display device according to the sixth embodiment.

FIG. 11A is a schematic cross-sectional view illustrating a display device according to a sixth embodiment, and FIG. 11B is a schematic cross-sectional view illustrating a light directing unit 520 included in the display device according to the sixth embodiment.

The display device according to the sixth embodiment is different from the display device according to the fifth embodiment illustrated in FIG. 10A, in that the display device of the sixth embodiment includes no lens 412. Specifically, the light source unit is formed of, for example, only the light emitting element 111, and applies light to the second main surface of the light directing unit. Because the light emitted from the light emitting element 111 is not transmitted through the lens 412, the light is not parallelized in any direction. The light emitted from the light emitting element 111 has, for example, a spread angle with the second direction Y serving as the center in plan view. For example, the light directing unit 520 has the same structure as that of the light directing unit 420 illustrated in FIG. 10A and FIG. 10B.

The light directing unit 520 preferably has a structure including first prism portions 523, and second prism portions 524 in a position distant from the light source unit beyond the first prism portions 523, as illustrated in FIG. 11B. For example, the first prism portions 523 are the same as the prism portions described above. Each of the second prism portions 524 has a triangular cross section, and includes a third slope 524a facing the light source unit, and a fourth slope 524b facing reverse to the light source unit. A tilt angle ϕ1 of the first slope 523a with respect to an XY plane is preferably larger than a tilt angle ϕ2 of the third slope 524a with respect to the XY plane. Because the light emitted from the light source unit is not parallelized, the light reaching the second main surface 522 of the light directing unit 520 has different incident angles according to the distance to the light source unit. With the first prism portions 523 and the second prism portions 524 having different tilt angles, the incident light is enabled to be directed perpendicularly to the liquid crystal layer LC.

Seventh Embodiment

FIG. 12A is a schematic cross-sectional view illustrating a display device according to a seventh embodiment. FIG. 12B is a plan view illustrating the light source unit 410 and a light directing unit 620 illustrated in FIG. 12A. FIG. 12C is a diagram illustrating a light polarization direction, optical axis directions of a second retardation plate and a third retardation plate, and a transmission axis direction of the first polarizer.

The display device according to the seventh embodiment is different from the display device according to the fifth embodiment illustrated in FIG. 10A, in that the display device of the seventh embodiment includes no first retardation plate OD1, but includes a second retardation plate OD2 and a third retardation plate OD3. Each of the second retardation plate OD2 and the third retardation plate OD3 is a ¼ wavelength plate. The ¼ wavelength plate converts linearly polarized light into circularly polarized light, when the light to be transmitted is linearly polarized light having a polarization direction rotated by 45° with respect to the optical axis direction. The light directing unit 620 is the same as the light directing unit 420 illustrated in FIG. 10A.

The light emitted from the light emitting element 111 is polarized in the polarization direction P1 parallel with the first direction X, and made incident on the lens 412 in the same manner as the display device illustrated in FIG. 10A. The lens 412 converts light from the light emitting element 111 parallel, in a cross section parallel with the second direction Y and the third direction Z, and does not convert light from the light emitting element 111 parallel, in planes other than the cross section described above.

As illustrated in FIG. 12C, the second retardation plate OD2 is a ¼ wavelength plate with an optical axis direction R4 rotated by 45° clockwise with respect to the polarization direction P1 of the light to be transmitted. The light that has passed through the lens 412 is made incident on the second retardation plate OD2, and the linearly polarized light is converted into circularly polarized light. The circularly polarized light is made incident on the light directing unit 420, and directed perpendicularly to the optical element layer formed of the liquid crystal layer LC, in the same manner as the display device according to the fifth embodiment. The third retardation plate OD3 is a ¼ wavelength plate with an optical axis direction R5 rotated by 45° counterclockwise with respect to the first direction X. The light that has passed through the third retardation plate OD3 is converted into linearly polarized light with the polarization direction P1 parallel with the first direction X. The transmission axis direction TA1 of the first polarizer PL1 is parallel with the first direction X. Accordingly, the light is transmitted through the first polarizer PL1, and applied to the liquid crystal layer LC.

Eighth Embodiment

FIG. 13 is a schematic cross-sectional view illustrating a display device according to an eighth embodiment.

The display device according to the eighth embodiment is different from the display device according to the seventh embodiment illustrated in FIG. 12A, in that the display device of the eighth embodiment includes no lens 412. Specifically, the light source unit is formed of, for example, only the light emitting element 111, and applies light to the first main surface 721 of the light directing unit 720. The light emitted from the light source unit is not parallelized, because the light does not pass through the lens 412. For this reason, the light has a spread angle. As a light directing unit 720, the light directing unit 520 illustrated in FIG. 11B is preferably used, although the light directing unit may be the light directing unit 420 illustrated in FIG. 10B.

Ninth Embodiment

FIG. 14A is a schematic cross-sectional view illustrating a display device according to a ninth embodiment.

The display device according to the ninth embodiment is different from the display device according to the second embodiment illustrated in FIG. 7, in that the display device of the eighth embodiment includes the first retardation plate OD1. The first retardation plate OD1 is disposed, for example, between the first polarizer PL1 and the light directing unit 420. Secondly, the display device includes the lens 412 illustrated in FIG. 10A and a light directing unit 820, instead of the lens 112 and the light directing unit 220. Specifically, the light source unit 410 is formed of the light emitting element 111 and the lens 412, and applies light to the first main surface 821 of the light directing unit 820.

FIG. 14B is a plan view illustrating the light source unit 410 and the light directing unit 820. In FIG. 14B, in comparison with FIG. 10B, the prism portions 423 correspond to prism portions 823, the first slope 423a corresponds to a first slope 823a, the second slope 423b corresponds to a second slope 823b, and the top line 423c corresponds to a top line 823c. The technical explanation of the prism portions is the same as that for FIG. 10B, and omitted. With the structure, light in positions corresponding to the points A, B, and C is transmitted through the first retardation plate OD1, thereby the polarization direction of the light becomes parallel with the transmission axis direction TA1 of the first polarizer PL1 in the same manner as FIG. 10O, and the light is transmitted through the first polarizer PL1. After the polarized light is directed by the light directing unit 820, the light passes through the first retardation plate OD1 and the first plate PL1 in this order, and is applied to the liquid crystal layer LC.

Tenth Embodiment

Figure 15A:
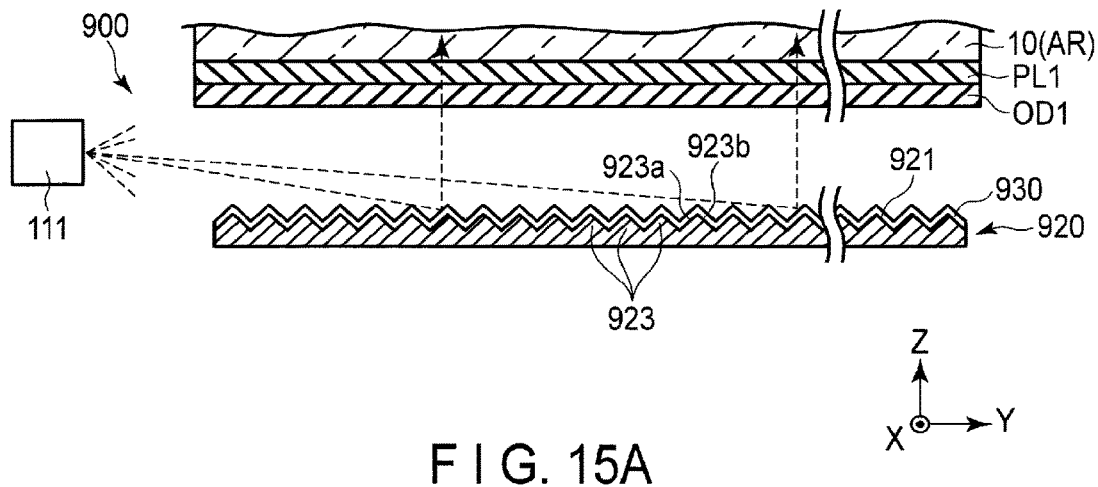
FIG. 15A is a schematic cross-sectional view illustrating a display device according to a tenth embodiment.

FIG. 15A is a schematic cross-sectional view illustrating a display device according to a tenth embodiment.

The display device according to the tenth embodiment is different from the display device according to the ninth embodiment illustrated in FIG. 14A, in that the display device of the tenth embodiment includes no lens 412. Specifically, the light source unit is formed of, for example, only the light emitting element 111, and applies light to the first main surface 921 of the light directing unit 920. Because the light emitted from the light emitting element 111 is not transmitted through the lens 412, the light is not parallelized in any direction. The light emitted from the light emitting element 111 has, for example, a spread angle with the second direction Y serving as the center in plan view. The light directing unit 820 illustrated in FIG. 14A and FIG. 14B may be used as the light directing unit 920.

Figure 15B:
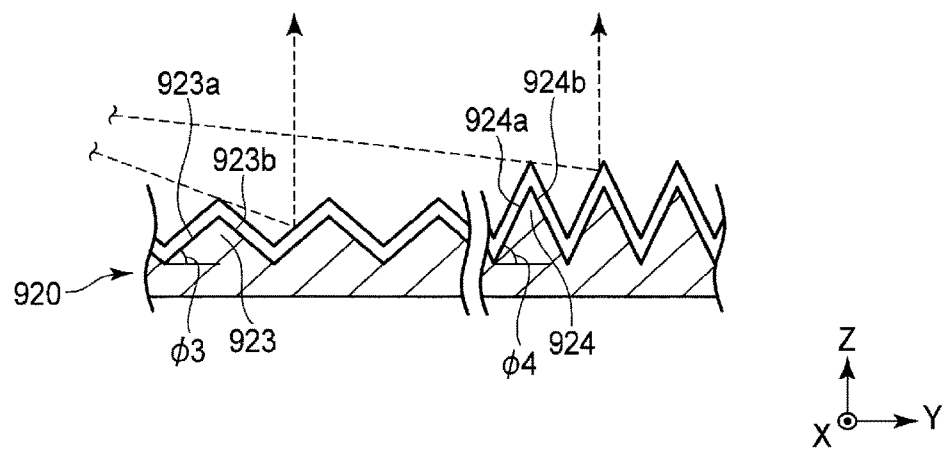
FIG. 15B is a schematic cross-sectional view illustrating a light directing unit included in the display device according to the tenth embodiment.

The light directing unit 920 preferably has a structure including first prism portions 923, and second prism portions 924 in a position distant from the light source unit beyond the first prism portions 923, as illustrated in FIG. 15B. For example, the first prism portions 923 have the same shape as that of the prism portions described above. Each of the second prism portions 924 has a triangular cross section, and includes a third slope 924a facing the light source unit, and a fourth slope 924b facing reverse to the light source unit. A tilt angle ϕ3 of the first slope 923a with respect to an XY plane is preferably smaller than a tilt angle ϕ4 of the third slope 924a with respect to the XY plane. Because the light emitted from the light source unit is not parallelized, the light reaching the first main surface 921 of the light directing unit 920 has different incident angles according to the distance to the light source unit. With the first prism portions 923 and the second prism portions 924 having different tilt angles, the incident light is enabled to be directed perpendicularly to the liquid crystal layer LC.

Eleventh Embodiment

FIG. 16A is a schematic cross-sectional view illustrating a display device according to an eleventh embodiment. FIG. 16B is a plan view illustrating the light source unit 410 and a light directing unit 1020 illustrated in FIG. 16A.

The display device according to the eleventh embodiment is different from the display device according to the ninth embodiment illustrated in FIG. 14A, in that the display device of the eleventh embodiment includes no first retardation plate OD1, but includes the second retardation plate OD2 and the third retardation plate OD3. The second retardation plate OD2 and the third retardation plate OD3 are the same as those illustrated in FIG. 12A and FIG. 12B, and are arranged in the same manner.

The light emitted from the light emitting element 111 is polarized in the polarization direction P1 parallel with the first direction X, and made incident on the lens 412 in the same manner as the configuration example illustrated in FIG. 14A. The lens 412 converts light from the light emitting element 111 parallel, in a cross section parallel with the second direction Y and the third direction Z, and does not convert light from the light emitting element 111 parallel, in planes other than the cross section described above.

In the same manner as FIG. 12C, the light is transmitted through the second retardation plate OD2 and the third retardation plate OD3, and thereby the light to be made incident on the first polarizer PL1 is converted into linearly polarized light with the polarization direction P1 parallel with the first direction X. The transmission axis direction TA1 of the first polarizer PL1 is parallel with the first direction X. Accordingly, the polarized light is transmitted through the first polarizer PL1, and applied to the liquid crystal layer LC.

Twelfth Embodiment

FIG. 17 is a schematic cross-sectional view illustrating a display device according to a twelfth embodiment.

The display device according to the twelfth embodiment is different from the display device according to the eleventh embodiment illustrated in FIG. 16A, in that the display device of the twelfth embodiment includes no lens 412. Specifically, the light source unit is formed of, for example, only the light emitting element 111, and applies light to a first main surface 1121 of a light directing unit 1120. The light emitted from the light source unit is not parallelized, because the light does not pass through the lens 412. For this reason, the light has a spread angle. As the light directing unit 1120, the light directing unit 920 illustrated in FIG. 15B is preferably used, although the light directing unit may be the light directing unit 820 illustrated in FIG. 14A.

In the display devices according to the first to the twelfth embodiments, the embodiments illustrate the configuration example in which the light source unit is disposed in a position corresponding to the center of a short side of the light directing unit, but the structure is not limited thereto. For example, the light source unit may be disposed in a position corresponding to the center of a long side of the light directing unit, or at a corner at which a long side and a short side of the light directing unit crosses.

In the display devices according to the second to the twelfth embodiments, the embodiments disclose the example including one light emitting element, but the structure is not limited thereto. A plurality of light emitting elements may be arranged. In the display devices according to the fifth to the twelfth embodiments, when a plurality of point light sources are arranged along a side of the light directing unit, the top lines of the prism portions of the light directing unit are preferably formed in a shape of arcs in a line with the emitting points of the respective light emitting elements as the centers. Arranging a plurality of light emitting elements enables emission of light with higher luminance and more uniform luminance distribution from the light irradiation unit.

In the display devices according to the first to the twelfth embodiments, the embodiments disclose the structure in which the emitting direction of light from the light source unit is fixed, but the light source unit may have a structure of scanning the emitting direction of light. Specifically, the light source unit may have a structure of successively applying light to each area of the first main surface or the second main surface of the light directing unit.

The illumination unit of the display device according to the first to the twelfth embodiment may have a structure in which linearly polarized laser light emitted from a laser light source is propagated through a polarization plane maintaining optical fiber. For example, a polarization plane maintaining optical fiber faces the second main surface of the light directing unit, and is disposed to be optically coupled with the second main surface of the light directing unit. This structure also produces the same effect as that of the present embodiment.

Some embodiments of the present invention described above are presented as examples, and are not aimed at limiting the scope of the invention. These novel embodiments can be carried out in various other forms, and various omissions, replacement, and changes may be made within a range not departing from the gist of the invention. These embodiments and modifications thereof are included in the scope and the gist of the invention, and included in the inventions recited in the claims and their equivalents.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a display panel including a first substrate, a second substrate facing the first substrate, and an optical element layer provided between the first substrate and the second substrate;
    a first polarizer arranged on a surface of the first substrate that is disposed on a side reversed to the second substrate;
    a light directing unit arranged on a surface of the first polarizer that is disposed on a side reversed to the second substrate, and including a first main surface disposed on a side facing the first substrate, and a second main surface disposed on a side reverse to the first main surface; and
    a light source unit disposed on the first substrate side with respect to the display panel, and emitting polarized laser light toward the second main surface,
    wherein the second main surface has an uneven shape, and
    the polarized laser light is directly made incident on the second main surface without using a light guide plate which guides the laser light by reflection, and directed perpendicularly to the optical element layer.

2. The display device according to claim 1, wherein the polarized laser light is made incident on inside of the light directing unit from the second main surface, and refracted and reflected by the second main surface.

3. The display device according to claim 2, further comprising:
    first prism portions forming the uneven shape, wherein each of the first prism portions has a triangular cross section, and includes a first slope, and a second slope disposed distant from the light source unit beyond the first slope.

4. The display device according to claim 3, wherein a top line of each of the first prism portions has an arc shape projecting reverse to a side on which the light source is disposed.

5. The display device according to claim 3, further comprising:
    second prism portions forming the uneven shape, wherein each of the second prism portions has a triangular cross section, and includes a third slope, and a fourth slope disposed distant from the light source unit beyond the third slope,
    the second prism portions are disposed distant from the light source unit beyond the first prism portions; and
    the first slope has a tilt angle smaller than a tilt angle of the third slope.

6. The display device according to claim 1, further comprising:
    a light diffusion layer facing the second substrate of the display panel, and diffusing laser light,
    wherein the polarized laser light is applied to the light diffusion layer after passing through the optical element layer.

7. The display device according to claim 1, wherein the polarized laser light is laser light with a main wavelength of 480 nm or less,
    the display device further includes an emitting layer facing the second substrate of the display panel, and adsorbing the laser light to emit light,
    the emitting layer includes a red phosphor layer and a green phosphor layer, and
    the polarized laser light is applied to the emitting layer after passing through the optical element layer.

8. The display device according to claim 1, the polarized laser light is a collimated laser light.

9. A display device comprising:
    a display panel including a first substrate, a second substrate facing the first substrate, and an optical element layer provided between the first substrate and the second substrate;
    a first polarizer arranged on a surface of the first substrate that is disposed on a side reversed to the second substrate;
    a first retardation plate arranged on a surface of the first polarizer that is disposed on a side reversed to the second substrate;
    a light directing unit arranged on a surface of the first retardation plate that is disposed on a side reversed to the second substrate, and including a first main surface disposed on a side facing the first substrate, and a second main surface disposed on a side reversed to the first main surface; and
    a light source unit disposed on the first substrate side with respect to the display panel, and emitting polarized laser light toward the second main surface,
    wherein the second main surface has an uneven shape, and
    the polarized laser light is directly made incident on the second main surface without using a light guide plate which guides the laser light by reflection, and directed perpendicularly to the optical element layer, and then passes through the first retardation plate and the first polarizer in this order, and
    the first retardation plate rotates a polarization direction of the passing laser light to be parallel with a transmission axis direction of the first polarizer.

10. A display device comprising:
    a display panel including a first substrate, a second substrate facing the first substrate, and an optical element layer provided between the first substrate and the second substrate;
    a first polarizer arranged on a surface of the first substrate that is disposed on a side reversed to the second substrate;
    a third retardation plate arranged on a surface of the first polarizer that is disposed on a side reversed to the second substrate;
    a light directing unit arranged on a surface of the third retardation plate that is disposed on a side reversed to the second substrate, and including a first main surface disposed on a side facing the first substrate, and a second main surface disposed on a side reversed to the first main surface;

a light source unit disposed on the first substrate side with respect to the display panel, and emitting polarized laser light toward the second main surface; and a second retardation plate disposed between the light source unit and the light directing unit, wherein the second main surface has an uneven shape, and the polarized laser light is directly made incident on the second main surface without using a light guide plate which guides the laser light by reflection, and directed perpendicularly to the optical element layer, and each of the second retardation plate and the third retardation plate is a ¼ wavelength plate, and the polarized laser light passes through the second retardation plate, the third retardation plate, and the first polarizer in this order.

11. The display device according to claim 9, wherein the first retardation plate is a ½ wavelength plate, and the first retardation plate has slow axes that are line-symmetrical with respect to a center line of a luminous flux of the polarized laser light in plan view, and different according to a position with respect to the center line.

\* \* \* \* \*